(12) United States Patent
Oleszkiewicz et al.

(10) Patent No.: US 11,410,271 B2
(45) Date of Patent: *Aug. 9, 2022

(54) RECONSTRUCTING MISSING SLICES IN SLICE-BASED SCANS OF 3D OBJECTS

(71) Applicant: International Business Machines Corporation, Armonk, NY (US)

(72) Inventors: Maria H. Oleszkiewicz, Smardzowice (PL); Blazej R. Rutkowski, Cracow (PL); Wojciech Sobala, Cracow (PL); Piotr Padkowski, Lodz (PL)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/531,568

(22) Filed: Aug. 5, 2019

(65) Prior Publication Data

US 2020/0074591 A1 Mar. 5, 2020

Related U.S. Application Data

(63) Continuation of application No. 16/118,661, filed on Aug. 31, 2018, now Pat. No. 11,024,004.

(51) Int. Cl.
*H04N 19/587* (2014.01)
*G06T 3/40* (2006.01)
(Continued)

(52) U.S. Cl.
CPC .......... *G06T 3/4007* (2013.01); *G06T 3/4061* (2013.01); *G06T 5/50* (2013.01);
(Continued)

(58) Field of Classification Search
CPC .. G06T 5/002; G06T 5/20; G06T 1/20; G06T 3/4015; G06T 5/003; G06T 5/50;
(Continued)

(56) References Cited

U.S. PATENT DOCUMENTS 5,736,857 A * 4/1998 Taft ................... G01R 33/5608
324/309
7,024,049 B2 4/2006 Bern
(Continued)

OTHER PUBLICATIONS

Zimeras et al., Interactive Tele-Radiological Segmentation Systems for Treatment and Diagnosis, May 7, 2012 [retrieved Mar. 13, 2021], International Journal of Telemedicine and Applications, vol. 2012, Article ID 713739, 16 pages. Retrieved: https://www.hindawi.com/journals/ijta/2012/713739/ (Year: 2012).*

(Continued)

*Primary Examiner* — Matthew C Bella
*Assistant Examiner* — Dennis Rosario
(74) *Attorney, Agent, or Firm* — Grant M. McNeilly

(57) ABSTRACT

A method for enhancing a set of object scan images may be provided. The set of object scan images comprises at least two scan images. The method comprises determining first distance and determining an interpolated scan image, by applying an interpolation algorithm comprising determining any pixel of the interpolated scan image as a white pixel if the corresponding pixels on the scan images are both white. The same applies to black pixels. The method may further comprise determining any pixel which corresponding pixels are black on one of the two image scans and white on the other image scans as white (black) if a predefined percentage of the directly surrounding pixels is white (black) in the interpolated scan image. Furthermore, the method comprises inserting the interpolated scan image between the first scan image and the second scan image and repeating the above steps until a stop condition is met.

16 Claims, 5 Drawing Sheets

(51) Int. Cl.
*G06T 7/70* (2017.01)
*G06T 5/50* (2006.01)

(52) U.S. Cl.
CPC .............. *G06T 7/70* (2017.01); *H04N 19/587* (2014.11); *G06T 2207/10008* (2013.01); *G06T 2207/10088* (2013.01); *G06T 2207/10116* (2013.01); *G06T 2207/10132* (2013.01); *G06T 2207/20224* (2013.01)

(58) Field of Classification Search
CPC ......... G06T 3/4007; G06T 2207/20182; G06T 2207/20208; G06T 2207/20221; G06T 5/007; G06T 7/0012; G06T 2207/10088; G06T 2207/10132; G06T 3/4023; G06T 3/4038; G06T 2207/10116; G06T 2207/10081; G06T 3/4053; G06T 2207/10101; G06T 2207/10136; G06T 2211/424; G06T 2207/10016; G06T 9/004; H04N 9/04515; H04N 2209/046; H04N 19/59; H04N 19/587; H04N 21/440281; H04N 21/234381; H04N 7/0135; H04N 7/0145; A61B 6/032; G06V 10/245

See application file for complete search history.

(56) References Cited

U.S. PATENT DOCUMENTS

| | | | |
|---|---|---|---|
| 8,814,797 B2 | 8/2014 | Katou | |
| 11,024,004 B2* | 6/2021 | Oleszkiewicz | G06T 7/70 |
| 2004/0068530 A1* | 4/2004 | Yamazaki | G06T 17/20 708/290 |
| 2006/0267904 A1* | 11/2006 | Aiba | G09G 3/3611 345/98 |
| 2009/0115908 A1* | 5/2009 | Walls | H04N 5/145 348/E5.062 |
| 2014/0049781 A1 | 2/2014 | Nebosis | |
| 2017/0258432 A1 | 9/2017 | Choi | |
| 2017/0360578 A1* | 12/2017 | Shin | B33Y 50/00 |
| 2020/0074590 A1* | 3/2020 | Oleszkiewicz | G06T 3/4007 |
| 2021/0063552 A1* | 3/2021 | Clark | G01S 7/52069 |

OTHER PUBLICATIONS

Wang, Numerical Modeling of Nasal Cavities and Air Flow Simulation, May 15, 2006 (retrieved Mar. 15, 2021), Auburn University, Dissertation, 146 pages. Retrieved: http://etd.auburn.edu/handle/10415/475 (Year: 2006).*

U.S. Appl. No. 62/6111,893, System and Method for Adaptively Configuring Dynamic Range for Ultrasound Image Display, Dec. 29, 2017 (corresponding to Clark et al. US 2021/0063552 A1), 22 pages. (Year: 2017).*

Drawings of U.S. Appl. No. 62/6111,893, System and Method for Adaptively Configuring Dynamic Range for Ultrasound Image Display, Dec. 29, 2017 (corresponding to Clark et al. US 2021/0063552 A1), 7 pages. (Year: 2017).*

Baghaie, et al., "An Optimization Method for Slice Interpolation of Medical Images", Cornell University Library, Mar. 27, 2014, 4 pages, <https://arxiv.org/abs/1402.0936>.

List of IBM Patents or Patent Applications Treated as Related, dated Aug. 4, 2019, 2 pages.

Oleszkiewicz et al., "Reconstructing Missing Slices in Slice-Based Scans of 3D Objects," U.S. Appl. No. 16/118,661, filed Aug. 31, 2018.

Huang et al., "X-ray tomography image-based reconstruction of microstructural finite element mesh models for heterogeneous materials," Sep. 29, 2012 [on-line] [retrieved May 4, 2020], Computational Materials Science, vol. 67, pp. 63-72. https://www.sciencedirect.com/science/article/pi i/S0927025612005241 (Year: 2012).

Barequet et al., "Piecewise-Linear Interpolation between Polygonal Slices*," Mar. 1996 [retrieved Jan. 14, 2021], Computer Vision and Image Understanding, vol. 63, Issue 2, pp. 251-272. Retrieved: https://www.sciencedirect.com/science/article/pi i/S 1077314296900181 (Year: 1996).

* cited by examiner

RECONSTRUCTING MISSING SLICES IN SLICE-BASED SCANS OF 3D OBJECTS

FIELD OF THE INVENTION

This disclosure relates generally to a method for enhancing a set of scan images, and more specifically, to a computer-implemented method for enhancing a set of object scan images, wherein the set of object scan images comprises at least a first scan image and a second scan image.

BACKGROUND 3-dimensional (3D) scanning techniques, image analysis and commit representation belongs to the scientific instruments used to make the inside of a closed body visible to humans. Such techniques are instrumental in the medical sector as well in the field of material science. Weldseams and longitudinal knit lines—e.g., of pipelines and other industrial components—may be investigated using these 3D imaging techniques, and they may be helpful in cancer treatment or any other human body internal misalignment.

These 3D scanning techniques rely on the so-called "slices" that are, in an ideal case, equidistant to each other on an axis normal to the surface of the images. Additionally, it is assumed that such 2D images (i.e., slices) are representing cross-sections of scanned objects.

In reality, the number of slices or distances between the slices may depend on the size of the scanned object (e.g., a part of the human or animal body), the type of scanner used, and also other factors. Sometimes, one or more slices are missing or damaged for some unknown reason.

However, unequally spaced slices may represent a problem for some computer vision algorithms. For example, data of such non-uniform format are difficult to use in algorithms in which slices are compared and/or processed between different scans for the same person. Another example may be an image pre-processing for the manufacture of elements, using 3D printing technology e.g., a part(s) of an implant or prosthesis and/or mechanical, industrial parts. Many 3D printers require, by nature of their work principle, uniform data because their deposited layers typically have the same thickness.

SUMMARY

According to some embodiments of the present disclosure, a computer-implemented method for enhancing a set of object scan images may be provided. The set of object scan images may comprise at least a first scan image, and located at a distance therefrom a second scan image. The method may comprise determining as an interpolation distance half the first distance and determining an interpolated scan image, by applying to a black and white representation of the first scan image and the second scan image an interpolation algorithm.

The interpolation algorithm may comprise determining any pixel of the interpolated scan image as a white pixel if the corresponding pixels on the first scan image and on the second scan image are both white and determining any pixel of the interpolated scan image as a black pixel if the corresponding pixels on the first scan image and on the second scan image are both black.

The interpolation algorithm may further comprise determining any pixel of the interpolated scan image which corresponding pixels are black on one of the two, the first and the second, image scans and white on the other one of the two image scans, as white if a predefined percentage of the directly surrounding pixels is white in the interpolated scan image and determining any pixel of the interpolated scan image which corresponding pixels are black on one of the two, the first and the second, image scans and white on the other one of the two image scans, as black if a predefined percentage of the directly surrounding pixels is black in the interpolated scan image.

Additionally, the method may comprise inserting the interpolated scan image between the first scan image and the second scan image at the interpolation distance and treat it as first object scan image, and repeating the above steps until a predetermined delta distance value between the distance of the interpolation scan image, and the first image, and a target distance value is reached.

BRIEF DESCRIPTION OF THE SEVERAL VIEWS OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the invention is not limited.

Figure 1:
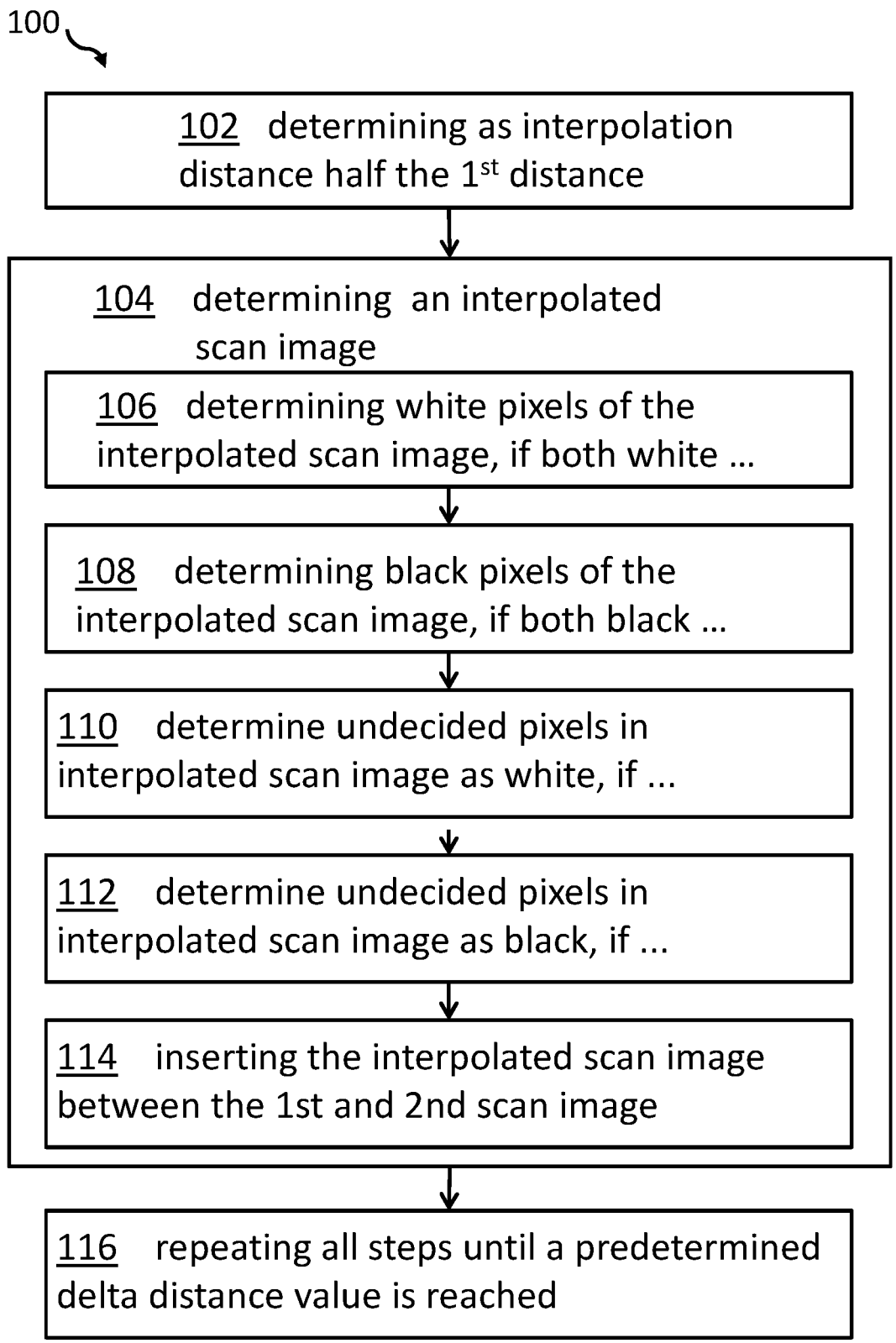

Some embodiments of the invention will be described, by way of example only, and with reference to the following drawings:

FIG. 1 shows a block diagram of an embodiment of an inventive computer-implemented method for enhancing a set of object scan images.

Figure 2:
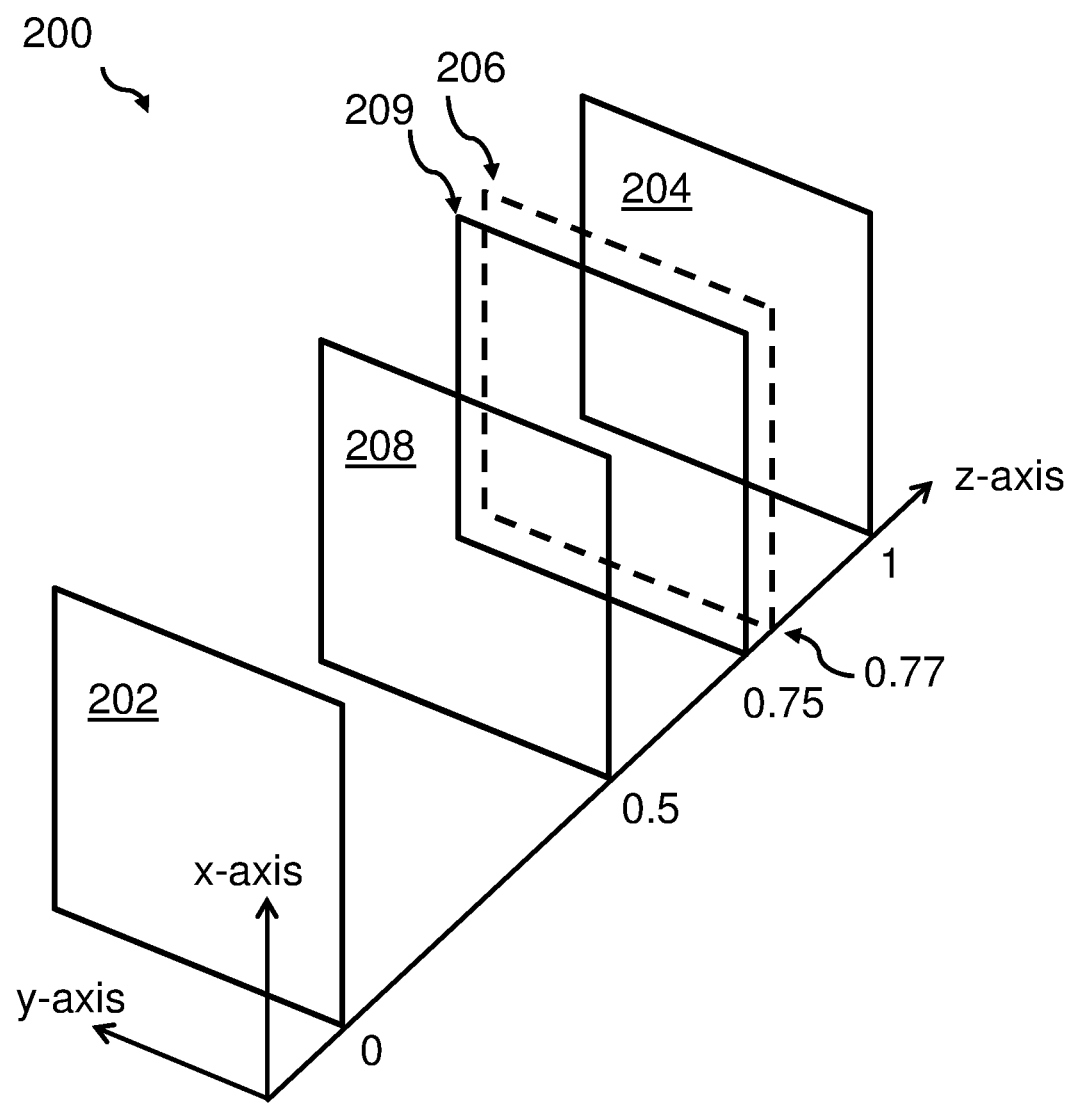

FIG. 2 shows a block diagram of an embodiment image scan in different distances to each other.

Figure 3:
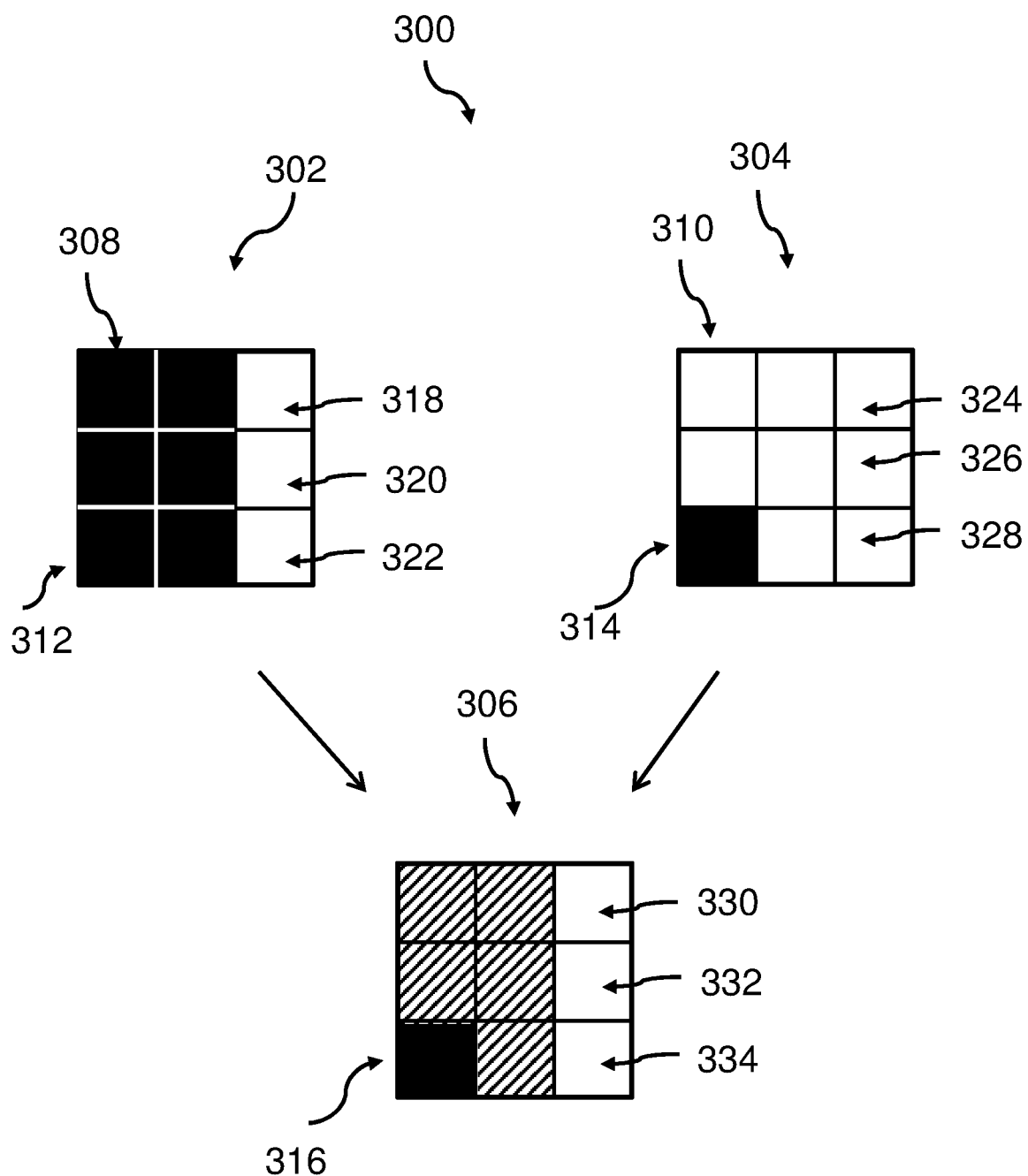

FIG. 3 shows a portion of scan images, the first scan image and the second scan image, as well as, an intermediate interpolated scan image.

Figure 4:
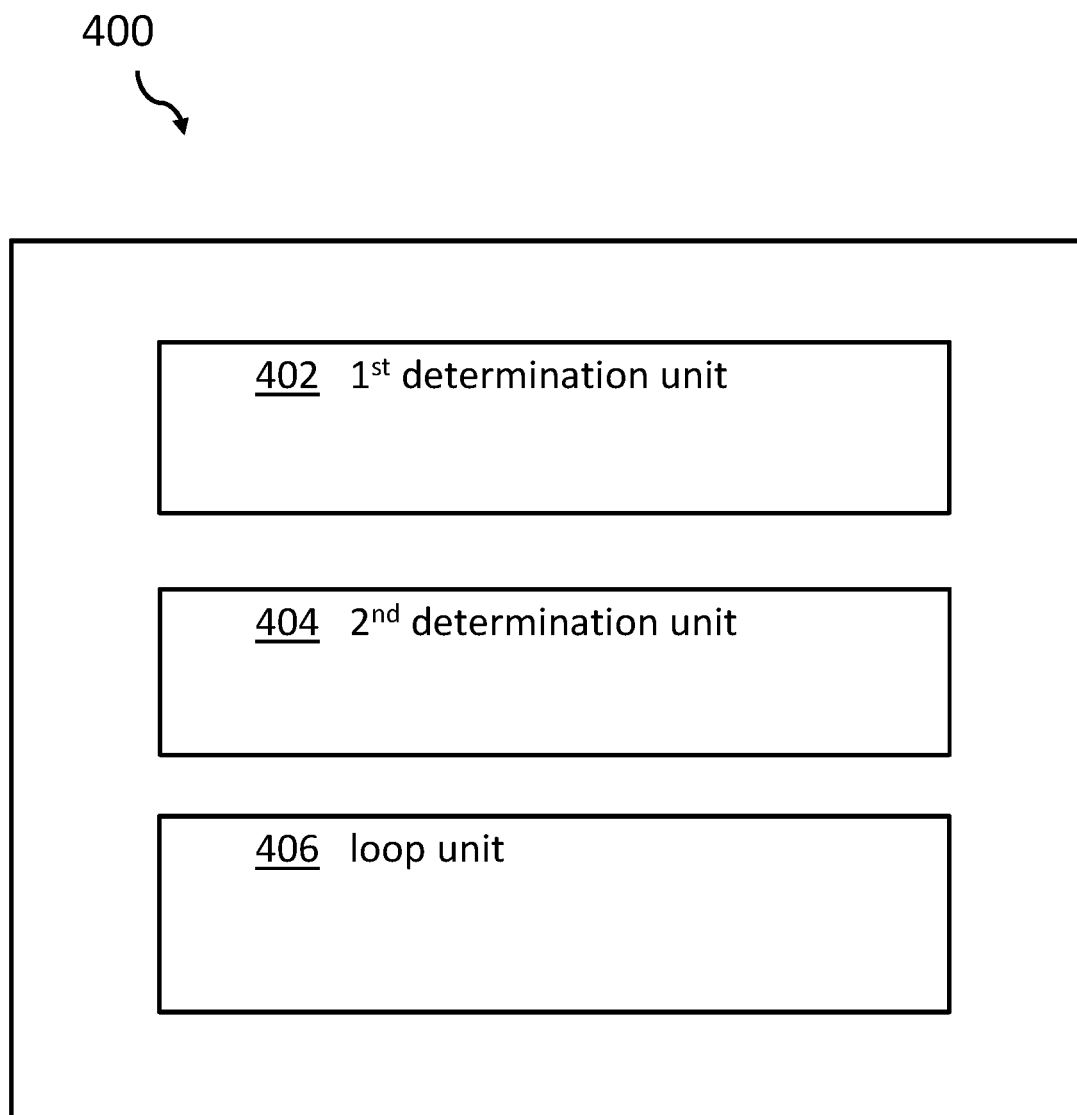

FIG. 4 shows a block diagram of an embodiment of a system for enhancing a set of object scan images.

Figure 5:
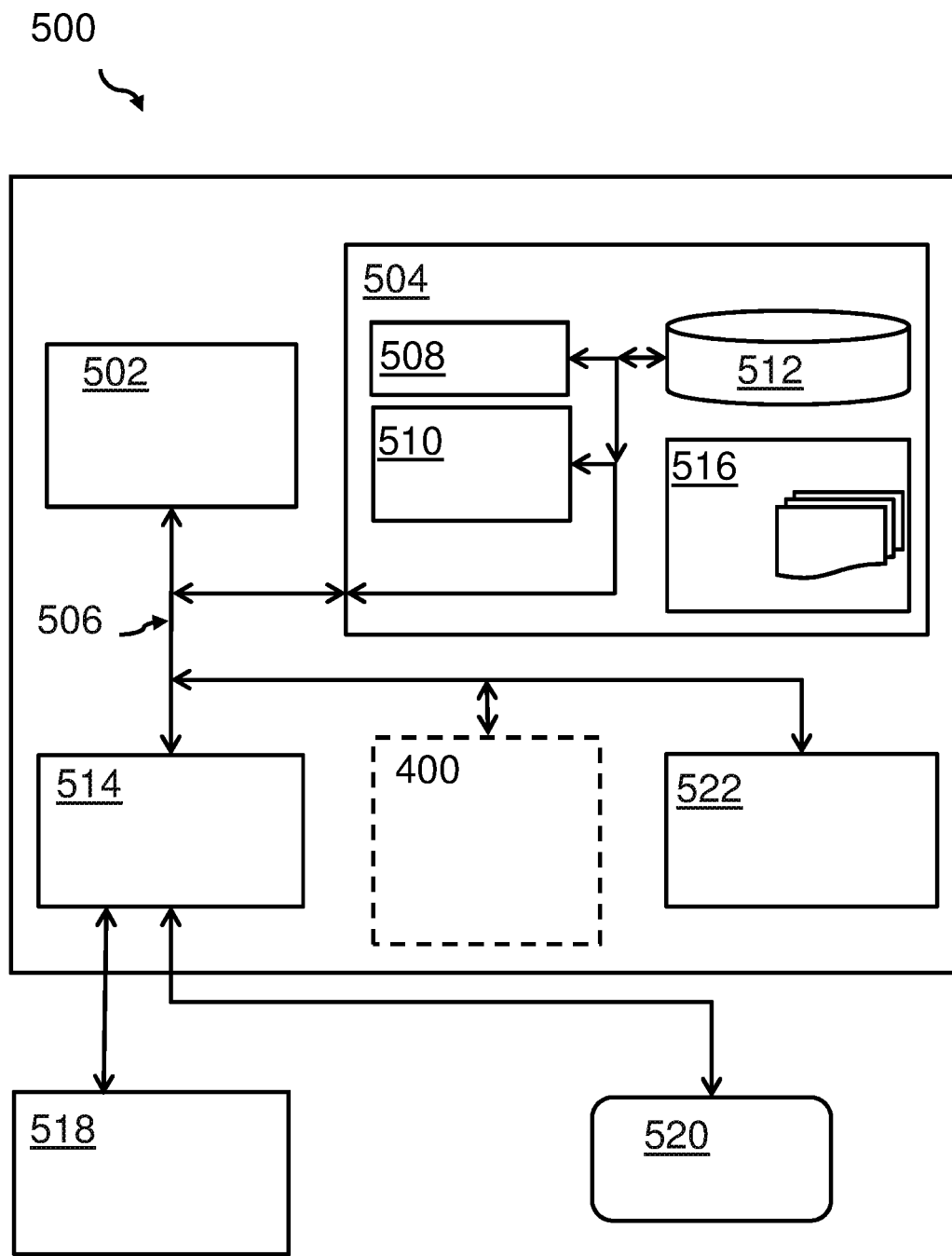

FIG. 5 shows an embodiment of a computing system comprising the system for enhancing a set of object scan images.

DETAILED DESCRIPTION

In the context of this description, the following conventions, terms and/or expressions may be used:

The term 'scan image' may denote a 2-dimensional (2D) image of a cut through a 3-dimensional (3D) object. Such a 2D image may also be denoted as slice, in particular, of the 3D object. Typically, the 2D image or slice may be represented as a two-dimensional matrix of data points representing color values of individual image scans. The resulting set of scan images may therefore have a natural sequence, thus, it may be a sorted set of scan images.

The term 'interpolation distance' may denote a distance from an interpolated—i.e., newly generated, image to a first scan image. Thereby, it may be assumed, that the interpolated image will have a position in between the first scan image and the second scan image. Thereby, it may be assumed that the first scan image is a moving target. It may have a new position after each interpolation step.

The term 'interpolated scan image' may denote a generated scan image which actually is not a result of a scan process, but a result of an applied method. Thereby, the characteristic—in particular, color information—of pixels of the interpolated image may be determined by the left and the right neighboring image. The left and/or the right image(s) is/are—in the first step—the originally object scan images. Further down the method flow, also the left and/or the right scan image may be an interpolated scan image.

The term 'black and white representation' may denote that the color information of a pixel of the related scan image may have a depth of one bit. I.e., only the two colors "black" and "white" may be differentiated.

The term 'interpolation algorithm' may denote a method for generating a new artificially created scan image out of a set of object scan images. The characteristic—in particular the color information of a pixel of the newly created scan image—may be derivable from corresponding pixels of direct neighboring scan images of the newly created scan image.

The term 'undecidable pixel' may denote a pixel in the interpolated image which corresponding pixel in the first scan image and the second scan image have a combination of white/black or black/white. Thus, it may not be possible to decide for either color (black/white) information from the beginning. Further considerations and determinations ought to be made, e.g., also taking surrounding pixels into account.

The proposed computer-implemented method for enhancing a set of object scan images may offer multiple advantages and technical effects:

The method allows producing a homogeneous, i.e., equidistant, set of scanned images with equal distances between the different images or slices of a set of scanned images of a three-dimensional object. The original set of scanned images may have varying distances between some of the slices. This deficiency may be eliminated by the proposed concept.

Thus, also a set of scanned images not fulfilling requirements of downstream applications like visualization applications or 3D printing systems may be enhanced in a way that the requirements are fulfilled.

Hence, also a set of scanned images with missing or damaged slice images may be repaired and thus, may be made usable in the mentioned application fields.

Additionally, the method may be easy to implement and may not require a lot of computing resources because in many cases only one simple "yes"/"no" decision has to be made to determine the state represented in the image as a black or a white pixel. For most pixels of the newly created intermediate scanned image no computation/mathematical calculation may be performed.

For those pixels being black on one of the start slice images and black on the other one also only simple "yes"/"no" decisions are to be made. This may make the proposed method very fast and gentle to computing resources. Basically, an interpolated image may be generatable in "one go" meaning one iteration step; however, more than one iteration step may be performed to generate a complete interpolated image.

Furthermore, a quality parameter may be used as input in order to define a stop criterion for the method being implemented as a cycling method. The chosen nested interval technique is known to be converging pretty fast.

The option to use parallel hardware in order to execute the method on different computing units for different pairs of scan images multiplies the advantages of the here proposed method.

According to some embodiments of the method, the first scan image and the second scan image may have the same size. This may—in particular—apply to the width and the height of the scan images. Thus, an algorithm comparing related pixels of two scan images may easily be addressed in a corresponding matrix representing the pixels.

According to some embodiments of the method, the first scan image and the second scan image have the same number of pixels per image area. Thus, no adaptation and/or transformation may be required in order to apply the proposed algorithm to the image scan in order to generate an interpolated scan image.

According to some embodiments of the method, the interpolated scan images, not matching the interpolation distance, may be stored as temporary scan images together with the related distance value. Hence, they may be available for a future generation of interpolated images under different conditions. This may save valuable compute time.

According to some embodiments of the method, the first scan image and the second scan image may be parallel to each other. This may be a useful feature in order to allow an easy interpretation of the scanned images for a skilled person. Additionally, a typical scanning system generates the sets of scanned images in a way that the data slices are oriented parallel to each other.

According to some embodiments of the method, the interpolated scan image may be parallel to the first scan image. This may allow an easier interpretation of the scan images—the interpolated scan image in the context of the original scan images. Obviously, the interpolated scan image would also be oriented parallel to the second scan image because the first and the second scan image may also be oriented parallel to each other.

According to some embodiments of the method, a set of colored object scan images may be converted to a black and white representation before further processing by the proposed method.

According to some embodiments of the method, a source of the scan images may comprise—but may not be limited to—at least one out of the group comprising an X-ray scan, an MRT (magneto resonance tomography) scan, and an ultrasonic scan. However, any other method generating scanned sets of images in different depth of a 3D object may be used as a source.

According to some embodiments of the method the resulting set of scan images—i.e., a mixture of original and intermediate images—may be useable as control data for a 3D printer. Thus, a prerequisite for 3D printers may be fulfillable even if, in the original set of scanned images, they are not equidistant to each other.

According to some embodiments of the method, the method may be performed for the first scan image and the second scan image in parallel to performing the method for a third and a fourth scan image of the set of object scan images having a second distance to each other. Thus, different interpolated images may be generated within the ordered set of scan images in parallel. This may allow exploiting parallel hardware which may increase execution speed of the proposed method. The parallel execution may also operate with its own stop condition, i.e., a second interpolation distance and delta distance. Thus, the two parallel exertion streams may be performed completely independently.

In the following, a detailed description of the figures will be given. All instructions in the figures are schematic. Firstly, a block diagram of an embodiment of the inventive computer-implemented method for enhancing a set of object scan images is given. Afterwards, further embodiments, as well as embodiments of the system for enhancing a set of object scan images, will be described.

FIG. 1 shows a block diagram of an embodiment of the computer-implemented method 100 for enhancing a set of object scan images. The scanned images may be a result of any 3D object scanning method like X-ray, ultrasonic, MRT, and similar. The set of object scan images comprises at least a first scan image, and located at a distance therefrom a second scan image. The method comprises determining, 102, as an interpolation distance half the first distance and determining, 104, an interpolated scan image, by applying to a black and white representation of the first scan image and the second scan image an interpolation algorithm.

The interpolation algorithm comprises determining, 106, any pixel of the interpolated scan image as a white pixel if the corresponding pixels on the first scan image and on the second scan image are both white and determining, 108, any pixel of the interpolated scan image as a black pixel if the corresponding pixels on the first scan image and on the second scan image are both black.

The interpolation algorithm comprises further determining, 110, any pixel which corresponding pixels are black on one of the two, the first and the second image scans and white on the other one of the two image scans of the interpolated scan image as white if a predefined percentage of the directly surrounding pixels is white in the interpolated scan image and determining, 112, any pixel, which corresponding pixels is black on one of the two, the first and the second, image scans and white on the other one of the two image scans, of the interpolated scan image as black if a predefined percentage of the directly surrounding pixels is black in the interpolated scan image.

In some embodiments the only pixels that may be used for the determination of the percentage of directly surrounding pixels are ones that have not been "undecidable" before. Thus, only those surrounding pixels are considered that have either two white pixels or two black pixels on the corresponding first scan image and second scan image.

Thus, a sub-method provides color (black/white) information of initially "undecidable pixels.

The method 100 comprises further inserting, 114, the interpolated scan image between the first scan image and the second scan image at the interpolation distance and treat it as a first object scan image. Basically, the newly generated scan image will be inserted at half the first distance relative to the first scan image. Additionally, treating the interpolated scan image as a first scan image refers to using the interpolated scan image in lieu of the first scan image in successive iterations of generating new or additional interpolated scan images. It may be noted that the first distance will shrink by 50% for every additional image scan generation cycle because the scan image used or treated as the first scan image will be replaced by a newly generated interpolated scan image.

Thus, the color (black/white) of the pixels is decided in iterations. Thereby, it can be considered which color (black/white) has been determined in a previous iteration.

The method 100 further comprises repeating, 116, the above steps until a predetermined delta distance value between the position of the interpolated scan image generated in that iteration (or distance relative to a reference point of the original first scan image) and a target distance value from the first scan image is reached. This will be explained in more detail in the next figure.

FIG. 2 shows a block diagram 200 of a positioning of image scan in different distances to each other. It may—for simplicity reasons—be assumed that the first scan image 202 is positioned at "0" of an assumed z-axis. Thus, the first scan image 202 is extending along the x-axis and the y-axis. Additionally, it may be assumed that the second scan image 204 is positioned at "1" (any other distance is possible). It may also be assumed that a final interpolated image 206 shall be generated at a position of 0.77 on the z-axis. The predefined delta distance may be set to 0.05.

Then, in a first interpolation step, the first interpolated image 208 may be generated. It will be positioned at half the distance between the first scan image 202 and the second scan image 204, i.e., at a position 0.5 on the z-axis.

Next, it will be determined whether this newly generated scan image 208 will be within the predefined delta distance to the position of the target scan image which position is assumed to be at 0.77 on the z-axis. It turns out that of the effective delta distance is 0.77−0.5=0.27. This is larger than the predefined delta distance, and thus, the method steps are repeated generating a second interpolated scan image 209 at a position 0.75 on the z-axis.

The first interpolated image 208 becomes the first scan image and the first distance becomes the distance between the interpolated image 208 and the second scan image 204 at position "1" on the z-axis.

After the second iteration, the distance between the position 0.75 of the second interpolated scan image 209 and the target position of 0.77 is equal to 0.02, which is below the predefined delta distance of 0.05. Thus, the stop condition is reached and the second interpolated scan image 209 is taken as a result of the method 100.

FIG. 3 shows a drawing 300 of portions of scan images, the first scan image 302 and the second scan image 304, as well as, an intermediate interpolated scan image 306. It may be obvious that the examples for the first and the second scan images 302, 304 are only small cutouts of nine representative pixels of much larger scan images, typically having millions of pixels. However, the principle of deciding which color information a pixel in the interpolated scan image 306 will have can well be explained using this little cutout.

It is assumed that pixels having the same position within the scan images 302, 304 within each of the scan images correspond to each other. As an example, pixel 308 corresponds to pixel 310, and pixel 312 corresponds to pixel 314, etc., for the other pixels.

Now the color information (black/white) will be determined. As pixel 312 and 314 correspond to each other and both are black, also pixel 316 of the interpolated image 306 will be black.

Correspondingly, pixels, 318, 320, 322 are white; so are the corresponding pixels, 324, 326, 328. Consequently, the corresponding pixels, 330, 332, 334 will also be white in the interpolated image 306.

However, the striped pixels in the interpolated scan image 306 have either corresponding pixels that have the combination black/white or white/black on the first image scan 302/the second image scan 304, respectively. Thus, a direct determination because of equal pixel color information in the first scan image 302 and the second scan image 304 is not possible.

Now, different determination options exist to decide which color information such an "undecided" pixel shall have. One option is to determine the color information of at least one neighboring pixel of an undecided pixel. The direction of the neighboring pixel relative to the undecided pixel in which to look for a decision aid can be predefined. One option is to look always to the right side of the undecided pixel. Next, another direction (up, down, left, diagonal) may be chosen if the pixel to provide the decision help is also undecided.

Alternatively, the color information of an undecided pixel of the interpolated scan image 306 may be decided based on a predetermined amount of color information of a certain type (black or white). As each pixel has eight surrounding pixels, the color information of an undecided pixel may be decided to be white, if more than 50% of the surrounding pixels are also white. The same decision principle may be applied for an undecided pixel to turn black. Such an approach may also reflect a situation in which other undecided pixels may surround a pixel in question.

Additionally, also color information of pixels of a larger distance (second order distance) to an undecided pixel may be taken into account with a lower weight of the color information. Thus, pixels at a second order distance may have color weight information of only 50% or 25% if compared to the first order neighboring pixels.

If still in doubt, and in undecidable situations it may be decided to give such a pixel the color information "black" because a single black pixel does not disturb the impression of the complete interpolated scan image. In some embodiments, in undecidable situations it may be decided to give such a pixel the color information "white" because a single white pixel does not disturb the impression of the complete interpolated scan image.

FIG. 4 shows a block diagram of an embodiment of a system 400 for enhancing a set of object scan images. The set of object scan images comprises at least a first scan image, and located at a distance therefrom, a second scan image. The system comprises a first determination unit 402 adapted for determining as an interpolation distance half the first distance and a second determination unit 404 adapted for determining an interpolated scan image by applying to a black and white representation of the first scan image and the second scan image an interpolation algorithm. The second determination unit is also adapted for determining any pixel of the interpolated scan image as a white pixel if the corresponding pixels on the first scan image and on the second scan image are both white and determining any pixel of the interpolated scan image as a black pixel if the corresponding pixels on the first scan image and on the second scan image are both black. Furthermore the second determination unit is also adapted for determining any pixel which corresponding pixels are black on one of the two, the first and the second image scans and white on the other one of the two image scans of the interpolated scan image as white if a predefined percentage of the directly surrounding pixels is white in the interpolated scan image and determining any pixel, which corresponding pixels are black on one of the two, the first and the second, image scans and white on the other one of the two image scans, of the interpolated scan image as black if a predefined percentage of the directly surrounding pixels is black in the interpolated scan image.

Moreover, the second determination unit 404 is adapted for inserting the interpolated scan image between the first scan image and the second scan image at the interpolation distance and treat it as first object scan image; and the system 400 comprises a loop unit 406 adapted for invoking the first determination unit 402 and the second determination unit 404 until a predetermined delta distance value between the distance of the interpolation scan image and the first image and a target distance value is reached.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions described herein for enhancing a set of object scan images.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 400 for enhancing a set of object scan images may be a module in computer system/server 500 that is attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for enhancing a set of object scan images, said set of object scan images comprises at least a first scan image and, located at a first distance therefrom, a second scan image, said method comprising:
    determining, as an interpolation distance, half said first distance;
    generating an interpolation scan image by:
        determining a first pixel of said interpolation scan image as a white pixel by determining corresponding pixels on a black and white representation of the first scan image and on a black and white representation of the second scan image are both white;
        determining a second pixel of said interpolation scan image as a black pixel by determining corresponding pixels on the black and white representation of the first scan image and on the black and white representation of the second scan image are both black;
        determining a third pixel of said interpolation scan image, for which corresponding pixels on the black and white representation of the first scan image and on the black and white representation of the second scan image are not both black or both white, as white, by determining a predefined percentage of a plurality of directly surrounding pixels is white; and
        determining a fourth pixel of said interpolation scan image, for which corresponding pixels on the black and white representation of the first scan image and on the black and white representation of the second scan image are not both black or both white, as black, by determining a predefined percentage of said plurality of directly surrounding pixels is black;
    the method further comprising:
        inserting said interpolation scan image between said first scan image and said second scan image at said interpolation distance;

treating said interpolation scan image as a new first scan image located at said interpolation distance; and iteratively generating and inserting one or more new interpolation scan images between the first scan image and the second scan image by determining a second distance, which is a difference between a new interpolation distance of one of the new interpolation scan images and a target distance from the first scan image, is greater than a predetermined delta distance value.

2. The method according to claim 1, wherein said first scan image and said second scan image have a same size.

3. The method according to claim 1, wherein said first scan image and said second scan image have a same number of pixels per image area.

4. The method according to claim 1, wherein a plurality of interpolation scan images not within said predetermined delta distance value of said target distance are stored as temporary scan images together with a corresponding said interpolation distance.

5. The method according to claim 1, wherein said first scan image and said second scan image are parallel to each other.

6. The method according to claim 1, wherein said interpolation scan image is parallel to said first scan image.

7. The method according to claim 1, wherein a set of colored scan images including said set of object scan images is converted to a black and white representation.

8. The method according to claim 1, wherein a source of said set of object scan images comprises at least one of the group consisting of: an X-ray scan, an MRT scan, an ultrasonic scan.

9. The method according to claim 1, the method further comprising:
using said set of object scan images as control data for a three-dimensional (3D) printer; and
storing based on said second distance said one of said new interpolation scan images as a target scan image.

10. The method according to claim 1, wherein said method is performed for said first scan image and said second scan image in parallel to performing said method for a third and a fourth scan image of said set of object scan images having a third distance to each other.

11. A computer-implemented method for enhancing a set of object scan images, the method comprising:
determining a first representation of a first scan image, wherein the first representation is black and white;
determining a second representation of a second scan image, wherein the second representation is black and white;
determining that a first set of pixels of an interpolation scan image are white by determining that corresponding pixels on the first and second representations are both white;
determining that a second set of pixels of the interpolation scan image are black by determining that corresponding pixels on the first and second representations are both black;
generating the interpolation scan image using the determined first and second sets of pixels;
inserting the interpolation scan image halfway between the first scan image and the second scan image;
treating the interpolation scan image as a new first scan image; and
iteratively generating and inserting one or more new interpolation scan images between the first scan image and the second scan image;
wherein the iteratively generating and inserting the one or more new interpolation scan images between the first scan image and the second scan image is performed until a difference between a new interpolation distance of one of the new interpolation scan images and a target distance from the first scan image is equal to or less than a predetermined delta distance value.

12. The method of claim 11, further comprising:
determining that a third set of pixels of the interpolation scan image, for which corresponding pixels on the first and second representations are not both black or both white, are white by determining that a predefined percentage of a plurality of directly surrounding pixels is white;
wherein the determined third set of pixels is also used in generating the interpolation scan image.

13. The method of claim 12, further comprising:
determining that a fourth set of pixels of the interpolation scan image, for which corresponding pixels on the first and second representations are not both black or both white, are black by determining that the predefined percentage of the plurality of directly surrounding pixels is black;
wherein the determined fourth set of pixels is also used in generating the interpolation scan image.

14. A computer-implemented method for enhancing a set of object scan images, the method comprising:
determining a first representation of a first scan image, wherein the first representation is black and white;
determining a second representation of a second scan image, wherein the second representation is black and white;
determining that a first set of pixels of an interpolation scan image, for which corresponding pixels on the first and second representations are not both black or both white, are white by determining that a predefined percentage of a plurality of directly surrounding pixels is white; and
determining that a second set of pixels of the interpolation scan image, for which corresponding pixels on the first and second representations are not both black or both white, are black by determining that the predefined percentage of the plurality of directly surrounding pixels is black;
generating the interpolation scan image using the determined first and second sets of pixels;
inserting the interpolation scan image halfway between the first scan image and the second scan image;
treating the interpolation scan image as a new first scan image; and
iteratively generating and inserting one or more new interpolation scan images between the first scan image and the second scan image;
wherein the iteratively generating and inserting the one or more new interpolation scan images between the first scan image and the second scan image is performed until a difference between a new interpolation distance of one of the new interpolation scan images and a target distance from the first scan image is equal to or less than a predetermined delta distance value.

15. The method of claim 14, further comprising:
determining that a third set of pixels of an interpolation scan image are white by determining that corresponding pixels on the first and second representations are both white;
wherein the determined third set of pixels is also used in generating the interpolation scan image.

16. The method of claim 14, further comprising:
    determining that a fourth set of pixels of the interpolation scan image are black by determining that corresponding pixels on the first and second representations are both black;
    wherein the determined fourth set of pixels is also used in generating the interpolation scan image.

* * * * *